Nov. 14, 1944.   C. B. ULRICH   2,362,867
CULTIVATOR
Filed May 15, 1943   3 Sheets-Sheet 1
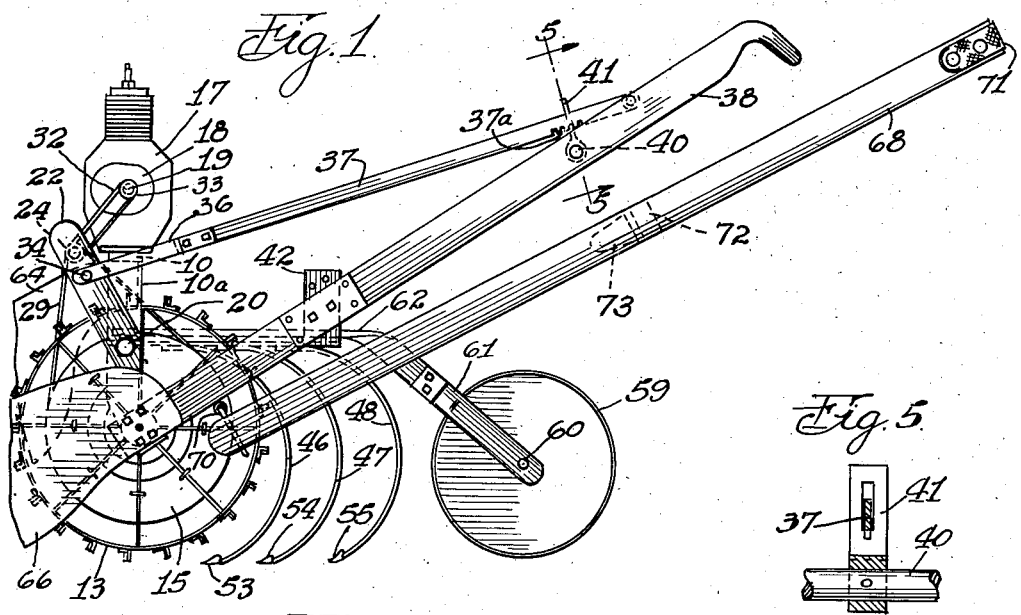
INVENTOR.
CHARLES B. ULRICH
BY Albert E. Bell
ATTORNEY.

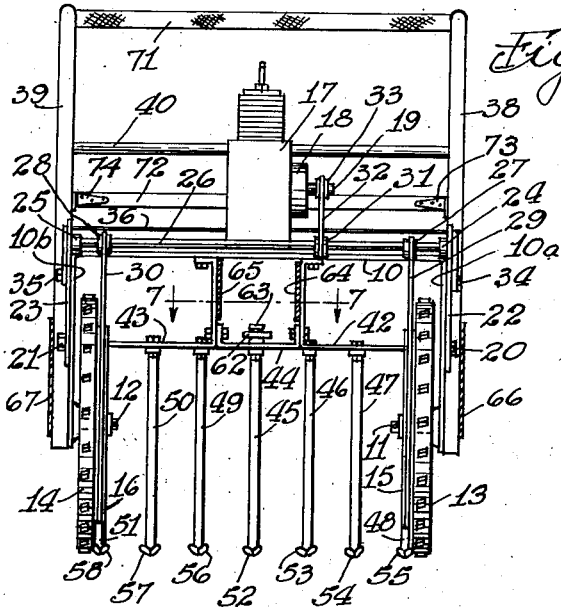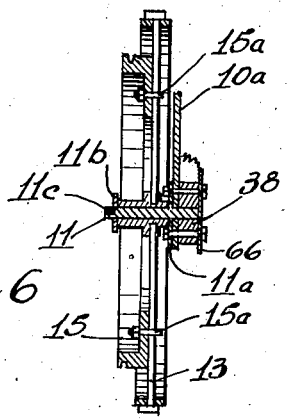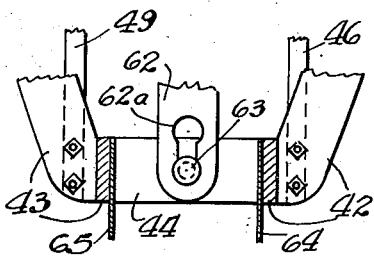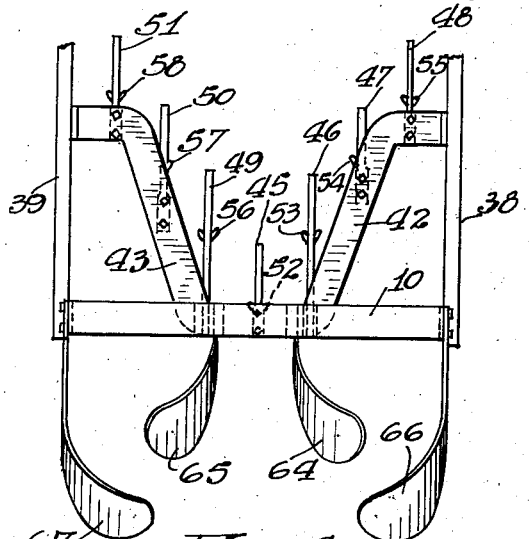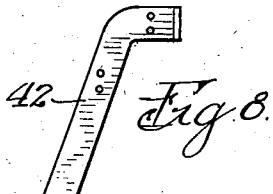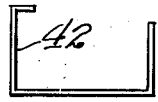

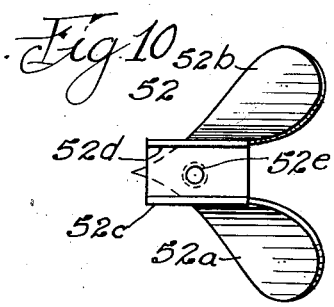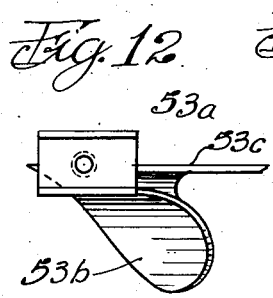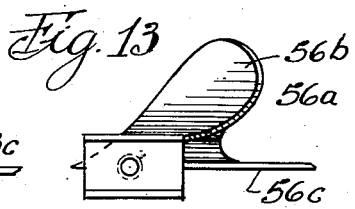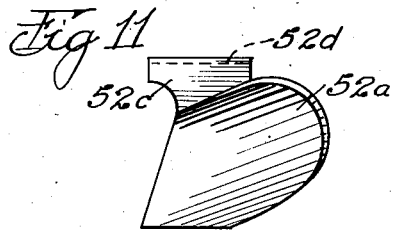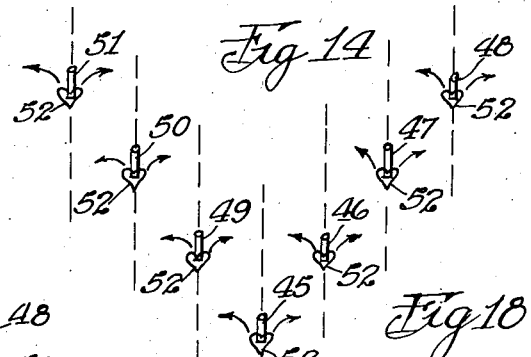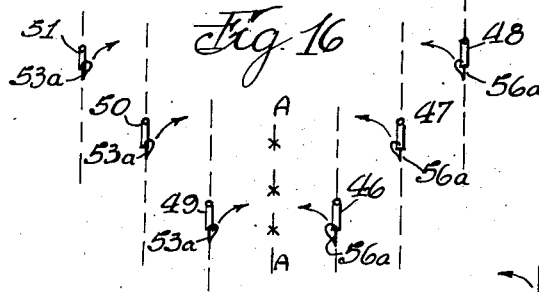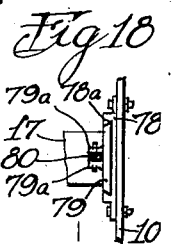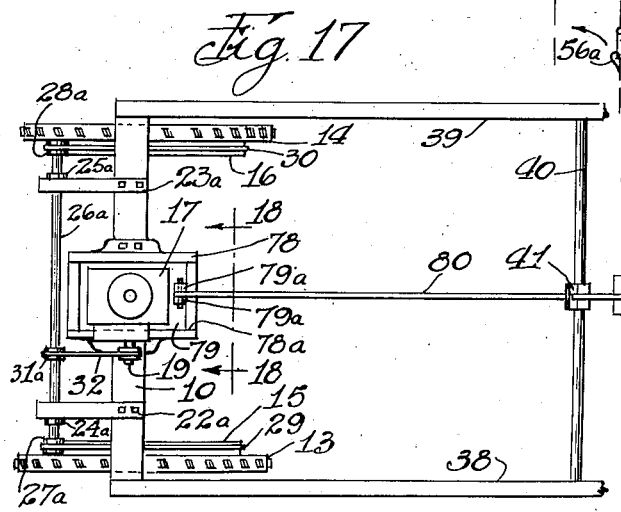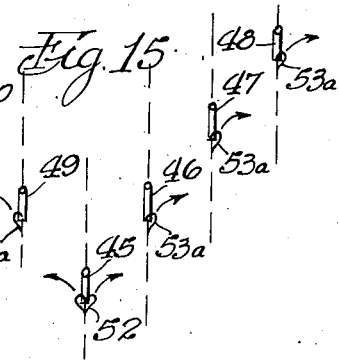

Patented Nov. 14, 1944

2,362,867

UNITED STATES PATENT OFFICE 2,362,867

CULTIVATOR

Charles B. Ulrich, Jamestown, N. Y.

Application May 15, 1943, Serial No. 487,097

6 Claims. (Cl. 97—168)

The invention pertains to cultivators for conditioning the soil for growing things generally, and for breaking up and working the soil adjacent to them during their growth, and particularly where the growing things are planted in rows.

The invention comprises a cultivator of the wheel type which preferably is power driven and is controlled and directed by an operator on foot, the machine being provided with means for manual operation where it is not desired to drive it by power.

The cultivator of the invention includes an engine-supporting frame comprising a U-shaped metal bar the legs of which have secured to them coaxial stud shafts on which the driving wheels are rotatably mounted. Belt wheels are rigidly secured to the driving wheels, and connection is made by belts through a countershaft with the engine, the countershaft being movable relatively to the engine to belt-tightening and loosening positions by devices accessible to and under the control of the walking operator, to drive and stop the movement of the cultivator as desired. A handle frame is rigidly secured to the main frame and extends rearwardly therefrom for steering and directing the cultivator by the operator, and a pusher frame is mounted below the handle frame for engagement with the body of the operator without interfering with his control of the handle frame, when it is desired to move the cultivator manually.

A sub-frame support for the cultivator points is provided, which includes bent bars connected at their front upper ends with the main frame from which they extend first downwardly and vertically and then rearwardly and in diverging relation, said bent bars being rigidly connected at their rear ends with the handle frame. Between the lower ends of the vertical portions of said bent bars, a removable horizontal bar of said sub-frame is secured, to support the center one of the cultivator bars. The cultivator bars are preferably curved and somewhat resilient metal bars having removably secured to their lower ends, the cultivator points employed. The cultivator points are interchangeably of different types depending upon the kind of cultivating to be done, for example, points of one type to move the soil laterally in opposite directions therefrom, points of another type to move the soil laterally towards but one side of the cultivator, and points of a still different type to move the soil laterally towards but the other side of the cultivator. The cultivator is thus adapted to a wide variety of kinds of cultivation, such as general cultivation of the soil, moving the soil laterally in either direction for banking the soil against desired rows of plants, or in some cases, by removing the center cultivator bar and its supporting bar, straddling a desired row of plants and cultivating the same either with or without banking of the soil as desired, and even where the straddled plants have substantial height, because of the substantial center clearance then provided by the machine.

The cultivator is also preferably provided with removable fenders for raising the plant tops and moving them into general alignment with the cultivated rows, whether the latter are at the sides of the machine, or a center row is being straddled and cultivated.

In some cases compacting the cultivated soil is desirable, for example, where the machine is used to condition the soil for seeding, or where the soil is loose and sandy. For such use, the cultivator of the invention is provided with a roller back of the cultivator bars, which is provided with a draw-bar having readily removable connection with a stud rigidly carried by the frame of the machine.

The cultivator of the invention is adapted particularly to the cultivation of small plots, but being in its preferred form power driven, it can be used effectively under any circumstances to which a walking cultivator is adapted.

The cultivator of the invention consists of simple parts which are cheap to make and assemble, and yet the machine is quite as effective and durable as cultivators which are much more complicated and expensive.

It is the object of my invention to produce a cultivator of the construction described, as and for the purposes set forth.

My invention will be best understood by reference to the accompanying drawings illustrating a preferred embodiment thereof, in which Fig. 1 shows the cultivator in side elevation, Fig. 2 is a plan view of the structure shown in Fig. 1, Fig. 3 is a front elevation of the structure shown in Figs. 1 and 2, Fig. 4 is a plan view of the main frame and of the cultivator point supports removed from the remaining structure, Fig. 5 is a sectional, detail view to an enlarged scale, of a part of the structure shown in Fig. 1, taken along the line 5—5 in Fig. 1, Fig. 6 is a vertical, central, sectional view to an enlarged scale through one of the driving wheels of the machine, Fig. 7 is a horizontal, sectional view to an enlarged scale of a part of the structure shown in Fig. 3, taken along the line 7—7 in Fig. 3, Fig. 8 shows in plan view one of the cultivator point supporting bars removed from the remaining structure, Fig. 9 is an end elevation of the bar shown in Fig. 8, Fig. 10 shows in plan view to an enlarged scale, a type of cultivator point for moving the soil in opposite directions laterally from the point, Fig. 11 is a side elevation of the structure shown in Fig. 10, Figs. 12 and 13 show in views similar to Fig. 10, types of cultivator points for moving the soil in but one direction or the other as the case may be, laterally from the points, Figs. 14, 15 and 16 are schematic plan views of different cultivator point arrangements, illustrating different uses of the machine, Fig. 17 shows in a view similar to Fig. 2, a modified structure for mounting the engine and for controlling operation of the cultivator, and Fig. 18 is a detail sectional view taken along the line 18—18 in Fig. 17.

Similar numerals refer to similar parts throughout the several views.

As shown in Figs. 1, 2 and 3, the cultivator includes a main frame 10 consisting of a bar of iron or steel bent into an inverted U-shape and having rigidly secured to the lower portions of its downwardly extending legs 10a and 10b, coaxial and horizontally disposed, stationary stud shafts 11 and 12 upon which driving wheels 13 and 14 are respectively mounted for rotation (Fig. 3). The wheels 13 and 14 have rigidly secured to them belt pulleys 15 and 16 respectively for driving said wheels. Said driving wheels are preferably provided with traction lugs as indicated, to prevent slippage of the wheels on soft soil.

The mid-portion of the bar 10 supports an internal combustion engine 17 preferably provided with speed reducing gearing illustrated diagrammatically at 18, by which the driving shaft 19 of the engine is rotated at a speed much slower than the speed of rotation of the crankshaft of the engine.

The frame legs 10a and 10b have pivotally secured to them at 20 and 21, the lower end portions of upwardly extending arms 22 and 23, the upper portions of which carry ball bearings 24 and 25 supporting a horizontally disposed countershaft 26 extending laterally of the machine. The shaft 26 has secured thereto small belt pulleys 27 and 28 connected by belts 29 and 30 respectively with the belt wheels 15 and 16. The shaft 26 also has secured thereto a small belt pulley 31 connected by a belt 32 with a similar small belt pulley 33 secured to the engine shaft 19. The pivotal supports 20 and 21 are substantially above the stud shafts 11 and 12 and the shaft 26 extends across the machine in front of the frame 10, as a result of which moving the arms 22 and 23 forwardly on their pivotal supports 20 and 21, tightens the belt 32, and moving said arms rearwardly loosens said belt, without materially changing the tension on the belts 29 and 30, thus providing a means for driving and stopping the cultivator while the engine 17 is running.

The arms 22 and 23 have pivotally connected to them at 34 and 35, the end portions of an operating yoke 36 of bent metal bars, rigidly secured to a rearwardly extending bar 37 for moving the arms 22 and 23 to start and stop the cultivator as desired.

The frame legs 10a and 10b have rigidly secured to them adjacent the stud shafts 11 and 12, the front ends of handles 38 and 39 extending upwardly and rearwardly from said stud shafts so that the rear ends of said handles may be at a convenient height to be grasped by the operator when the frame 10 is in substantially a vertical position. The handles 38 and 39 are rigidly connected by a horizontal cross bar 40 to form a rigid handle frame, and the central portion of said cross bar has rigidly secured thereto a slotted retaining lug 41 (Figs. 1 and 5) to receive the yoke bar 37. The lower edge of the bar 37 adjacent the lug 41 is preferably provided with notches 37a (Fig. 1), for retaining engagement with the lower edge of the slot in the lug 41, to hold the bar 37, the yoke 36 and the countershaft 26 in any desired adjustment, thereby maintaining either the stopped or driving condition of the cultivator, until the other condition is effected by movement of the bar 37 by the operator, relatively to the lug 41. This adjustment also provides a convenient means for taking up wear that may occur of the belt 32. The slot in the lug 41 holds the bar 37 in centered position between the handles 38 and 39 and thus provides for equal movement of the arms 22 and 23 in connection with any driving adjustment, and maintains the countershaft 26 in a position substantially parallel with the frame 10.

As particularly shown in Figs. 3 and 4, the frame 10 supports two sub-frame members 42 and 43 comprising bent metal bars, each of which members has a bent upper end rigidly secured to the frame 10, from which it extends vertically downwards and is then bent to extend outwardly and rearwardly, its rear end being rigidly secured to the corresponding one of the handles 38 and 39. The sub-frame member 42 is shown in Figs. 8 and 9 removed from the machine to more clearly show the form of said member, and the member 43 is similar but reversed in form as to its rearwardly and outwardly extending portion.

As shown in Fig. 3, the sectional sub-frame is completed by a horizontal mid-member 44 of bar metal having bent ends removably secured to the adjacent and spaced front and lower portions of the members 42 and 43, said member 44 and the rearwardly extending portions of the members 42 and 43 being preferably so proportioned and assembled as to be in substantially a single horizontal plane when the frame 10 is in vertical position. The sub-frame members 42, 43 and 44 are preferably secured together and to the supporting parts of the machine, by bolts as indicated, and the sub-frame comprises the support to which the cultivator bars are secured.

In the drawings, cultivator bars 45–51 inclusive are illustrated, each of said cultivator bars comprising a curved metal bar of sufficient strength and stiffness to move the corresponding cultivator point through the soil in the intended manner, and yet at the same time having sufficient resilience to yield when its point strikes an unyielding object such as a stone, to protect the cultivator bar and point from damage. The central cultivator bar 45 is rigidly secured at its upper end to the sub-frame member 44, the upper ends of the cultivator bars 46, 47 and 48 are rigidly secured to the sub-frame member 42, and the upper ends of the cultivator bars 49, 50 and 51 are rigidly secured to the sub-frame member 43. The cultivator points 52-58 inclusive are respectively secured to the cultivator bars 45-51 inclusive. The form of the sub-frame members above described, facilitates the arrangement of the cultivator points 52-58 inclusive, to be in a desired V pattern, with the central point 52 in a forward or leading position, and with the other points in lines diverging rearwardly and outwardly from said central point. The construction described permits the ready removal of the member 44 and its attached cultivator bar 45 where as below described, the maximum possible plant-clearance is desired centrally of the machine, which is the distance that the mid-portion of the frame 10 is from the ground, whereas the plant-clearance on either side of the center of the machine, as well as at the center of the machine when the cultivator bar 45 is in use, is the distance that the sub-frame is from the ground.

In cases where the cultivator is used in preparing the soil for seeding and in other cases where the soil cultivated is sandy and of loose texture, it is frequently desirable to compact the soil after the cultivating operation. To do this with my machine, I provide a roller 59 for removable attachment with the cultivator. The roller itself may be of any desired construction, but I prefer the type made of sheet metal to receive a water load when in use, because of the convenience and ease of handling the roller when it is not in use and the water is drained from it. The roller 59 as shown, is provided with end trunnions 60, 60 mounted for rotation in a yoke 61 provided with a central draw-bar 62 provided at its forward end with a slot 62a of the key-hole type (Fig. 7), so that the draw-bar may be passed over the upper end of a headed stud 63 rigidly secured to and extending upwardly from the sub-frame member 44. The draw-bar may thus be readily attached to and separated from the stud 63 as desired, without danger of separation of the parts while the roller is in use.

When it is desired to cultivate a row of relatively tall plants, such as corn, with the wheels of the cultivator straddling the row of plants being cultivated, and the sub-frame member 44 is removed to facilitate the operation, it frequently occurs that the tops of the plants will lie or fall under the sub-frame members 42 and 43, with damage to the plants, if not prevented from so doing. To guard against this, I provide the vertical portions of the members 42 and 43 with fenders 64 and 65, preferably of sheet metal, which are rigidly secured to said members in parallel vertical planes, said fenders extending forwardly from said members and being curved outwardly away from each other and downwardly, in a manner to engage the plant tops, raise the same and direct them to the clearance space between the members 42 and 43.

When it is desired to cultivate rows of plants or shrubs adjacent to and outside of the wheels of the cultivator, it frequently occurs that the tops of the plants or shrubs will lie or fall in the path of the adjacent wheel, if not prevented from so doing. To guard against this, I provide the vertical legs 10a and 10b with fenders 66 and 67, preferably of sheet metal, which are rigidly secured in vertical planes to said legs, said fenders 66 and 67 extending forwardly from said legs and being curved inwardly towards each other and downwardly, in a manner to engage the tops of the plants or shrubs, raise the same and direct them outwardly from the paths of the cultivator wheels and frame.

At times in the operation of the cultivator, either with the engine running, or without operation of the engine, it is desirable to operate the machine manually instead of by power, for example, in turning the machine at the ends of rows, or in aligning the machine with rows to be cultivated. To facilitate this, I provide the machine with a pusher frame as follows. Below the handles 38 and 39, I mount pusher bars 68 and 69, the front end of each of said bars being secured to the corresponding handle by an eye-bolt connection 70 as shown for the bar 68 in Fig. 1, which connection permits lateral movement of the pusher bar relatively to the handle. The rear ends of the pusher bars 68 and 69 are connected by a flexible band 71 of webbing or the like, the ends of which band extend around the ends of the pusher bars and are secured to the outer sides thereof as indicated. (Figs. 1 and 2.) A cross bar 72 is disposed between the rear portions of the pusher bars to maintain them in substantially parallel relation, and to hold them apart when a driving force is exerted on the band 71. The bar 72 is pivotally connected at its ends with the pusher bars by hinges 73 and 74 secured to said bar 72 and to said pusher bars. The result is a pusher frame capable of side and vertical movement relatively to the handle frame, but effectively transmitting to the handle frame and thereby to the cultivator frame, any driving force exerted on the band 71. In using the pusher frame, the body of the operator presses against the band 71, an adjustable neck band 77 being connected at its ends with the rear end portions of the pusher bars, to support the band 71 at a desired height on the body of the operator. This construction places the pusher band 71 in position for immediate use whenever needed, even though it may be used only occasionally. It also permits any needed operation of the handle frame without requiring corresponding movement of the body of the operator. The handle frame, besides serving to hold the cultivator to a desired course or line of action, serves to raise and depress the cultivator points, as desired.

The wheels 13 and 14 are preferably provided with cast metal hubs secured to spokes comprising metal rods secured at their outer ends to sheet metal rims. The wheels are mounted and secured to the belt wheels 15 and 16 as illustrated for the wheel 13 in Fig. 6, in which the flange of the belt wheel 15 is shown as rigidly secured to the spokes of the wheel 13 by U-bolts 15a. As shown in Fig. 6, the stud shaft 11 is provided with an integral flange 11a to facilitate connection with the frame leg 10a, said stud shaft being extended from said flange into corresponding openings in the leg 10a and in the handle 38 to facilitate assembling the parts and to strengthen the stud shaft connection. The wheel 13 is held in place by a washer 11b and by a cotter pin 11c inserted through the inner end of the stud shaft.

The cultivator points 52-58 inclusive may have any desired form and structure adapting them to the kind of cultivating to be done. Said points are preferably interchangeably secured to the corresponding cultivator bars to facilitate readily using the types of points desired, and arranging them in any relation best serving the requirements of any particular case.

In Figs. 10 and 11, I illustrate a construction of cultivator point 52 adapted for use on the central cultivator bar 45, as well as on the other cultivator bars where the machine is used for the general cultivation of the soil. As shown in Figs. 10 and 11, the point 52 is provided with similar and oppositely extending moldboards 52a and 52b which are either rigidly secured to or integral with the base 52c of the point, which base is provided in its horizontal upper surface with a shallow groove 52d to fit the lower end of the cultivator bar, said groove extending in the direction of a medial line between the moldboards 52a and 52b. The base 52c is also provided with a vertical, threaded bore 52e to receive the screw employed to secure the point to the cultivator bar, whereby a single screw serves to removably secure the point to the cultivator bar and movement of the point relatively to the cultivator bar is prevented.

The cultivator point 53a shown in Fig. 12 is similar in construction to the point 52 shown in Figs. 10 and 11, excepting that it is provided with but one moldboard 53b corresponding to the moldboard 52a of the point 52, and that it has a landslide 53c for holding the point 53a in its line of movement, against the lateral thrust produced by the action of the moldboard 53b.

The cultivator point 56a shown in Fig. 13, is similar in construction to the point 53a shown in Fig. 12, excepting that its single moldboard 56b and landslide 56c are reversely disposed relatively to each other, from the relation of the moldboard 53b and the landslide 53c to each other.

The point 52 is thus adapted to move the cultivated soil laterally from the line of movement of the point, in opposite directions away from said line, whereas the point 53a will move the soil in but one direction laterally, and the point 56a will move the soil in but one direction laterally which is opposite to the direction of soil movement effected by the point 53a.

In Figs. 14, 15 and 16, I illustrated schematically, different uses of the cultivator, the lower portions only of the cultivator bars and the points secured thereto, being shown. The lines of movement of the points are shown by broken lines, and the directions of soil movement effected by the points, are shown by the arrows. In Fig. 14, the cultivator bars 45–51 inclusive are provided with cultivator points 52 of the kind shown in Figs. 10 and 11 for general cultivation purposes, each of said points moving the cultivated soil laterally therefrom in opposite directions. In Fig. 15 the cultivator points are arranged to cultivate rows of plants or shrubs just outside of the wheels of the cultivator, with the further requirement that the soil be moved laterally towards the said cultivated rows. In this case, the bar 45 has secured thereto a point 52 of the kind shown in Figs. 10 and 11, each of the bars 46, 47 and 48 has secured thereto a point 53a of the kind shown in Fig. 12, and each of the bars 49, 50 and 51 has secured thereto a point 56a of the kind shown in Fig. 13. In Fig. 16 the cultivator points are arranged to cultivate a central row of plants A—A straddled by the wheels of the cultivator, the cultivator bar 45 being removed as above described. In this case, each of the bars 46, 47 and 48 has secured thereto a point 56a of the kind shown in Fig. 13, and each of the bars 49, 50 and 51 has secured thereto a point 53a of the kind shown in Fig. 12.

In Figs. 17 and 18 I illustrate a modified construction of driving control mechanism for the cultivator, by which to start and stop movement of the cultivator with the engine running, the engine is movable relatively to the frame of the machine, instead of moving the countershaft relatively to the engine as above described. In this case, the mid-portion of the main frame 10 has rigidly secured to it, a metal block 78 which is provided in its upper portion with a groove or channel 78a extending lengthwise of the machine. A second metal block 79 is fitted for sliding movement in the groove 78a, the edges of said groove or channel overlapping the opposite lateral edges of the block 79 to hold the latter in said groove. The engine 17 is rigidly mounted on the block 79 which is provided with lugs 79a to which the forward end of an adjusting bar 80 is pivotally connected. The bar 80 extends rearwardly through the slot in the lug 41, and is provided along its lower edge adjacent said lug, with notches for engagement with the lower edge of the slot in said lug in the manner and as described above for the bar 37. In this case, a countershaft 26a is provided which is similar in purpose to the shaft 26 but differently mounted. The shaft 26a is supported by roller or ball bearings 24a and 25a which are mounted in brackets 22a and 23a rigidly secured to the frame 10. The shaft 26a has secured thereto small pulleys 27a, 28a and 31a, similar to the pulleys 27, 28 and 31 on the shaft 26, for engaging the belts 29, 30 and 32. The shaft 26a is mounted in substantially the same relation to the engine shaft 19, as above described for the shaft 26. As a result of the fixed location of the shaft 26a, movement of the engine 17 towards the front or towards the rear of the machine, will stop or start the movement of the machine by loosening or tightening the belt 32, as desired. Excepting for the differences described, the cultivator illustrated in Figs. 17 and 18 is the same in construction and operation as above described in connection with Figs. 1–3 inclusive.

It will be noted that the lower ends of the legs 10a and 10b are extended rearwardly to support the stud shafts 11 and 12 to the rear of the central plane of the main frame 10, as a result of which the rotational moment of the frame 10 and parts carried thereby, around the stud shafts 11 and 12, produced by the weight of the engine 17 and by the weight of the said frame and attached parts, and the similar rotational moment produced by the drag of the cultivator points in the soil, substantially neutralize the opposite rotational moment of the frame 10 due to driving the wheels 13 and 14, thus reducing to a minimum the vertical pressures required to be exerted on the handles 38 and 39 by the operator.

The engine 17 is shown diagrammatically, and in practice any desired type of engine may be employed, which, together with any accessories required for its operation, may be secured to and carried by the frame 10.

While I have shown my invention in the embodiments set forth, it will be understood that I do not limit myself thereto as I may employ equivalents thereof without departing from the scope of the appended claims.

What I claim is:

1. In a walking cultivator having supporting wheels and guiding handles, the combination of a bent metal bar comprising an inverted U-shaped main frame having downwardly extending side legs supported by the wheels of the cultivator and for connection with the handles of the cultivator, said legs being outside of said wheels, the mid-portion of said U-shaped frame being higher than and extending over said wheels laterally of the cultivator, and a sub-frame including bent metal bars carried by said main frame between said wheels and providing a cultivator bar support between said wheels and in a horizontally disposed plane below the tops of said wheels, said sub-frame comprising two side sections laterally spaced from each other and rigidly secured to said main frame and a removable mid-section for bridging the space between said side sections, and readily removable devices connecting said mid-section with said side sections, whereby with said mid-section connected with said side sections a continuous support for cultivator bars is provided between said wheels and having a vertical plant clearance from the bottom of said sub-frame to the ground and with said mid-section removed a central vertical and increased plant clearance is provided from the mid-portion of said U-shaped main frame to the ground.

2. In a walking cultivator having supporting wheels and guiding handles, the combination of a bent metal bar comprising an inverted U-shaped main frame having downwardly extending side legs supported by the wheels of the cultivator and for connection with the handles of the cultivator, said legs being outside of said wheels, the mid-portion of said U-shaped frame being higher than and extending over said wheels laterally of the cultivator, and a sub-frame including bent metal bars carried by said main frame between said wheels and providing a cultivator bar support between said wheels and in a horizontally disposed plane below the tops of said wheels, said sub-frame comprising two side sections laterally spaced from each other and rigidly secured to said main frame and a removable mid-section for bridging the space between said side sections, and readily removable devices connecting said mid-section with said side sections, whereby with said mid-section connected with said side sections a continuous support for cultivator bars is provided between said wheels and having a vertical plant clearance from the bottom of said sub-frame to the ground and with said mid-section removed a central vertical and increased plant clearance is provided from the mid-portion of said U-shaped main frame to the ground, the metal bar of each of said side sections of said sub-frame having rigid connection at its forward end with said main frame and extending rearwardly and outwardly therefrom for connection with the corresponding guiding handle.

3. In a walking cultivator having supporting wheels and guiding handles, the combination of a bent metal bar comprising an inverted U-shaped main frame having downwardly extending side legs supported by the wheels of the cultivator and for connection with the handles of the cultivator, said legs being outside of said wheels, the mid-portion of said U-shaped frame being higher than and extending over said wheels laterally of the cultivator, and a sub-frame including bent metal bars carried by said main frame between said wheels and providing a cultivator bar support between said wheels and in a horizontally disposed plane below the tops of said wheels, said sub-frame comprising two side sections laterally spaced from each other and rigidly secured to said main frame and a removable mid-section for bridging the space between said side sections, and readily removable devices connecting said mid-section with said side sections, whereby with said mid-section connected with said side sections a continuous support for cultivator bars is provided between said wheels and having a vertical plant clearance from the bottom of said sub-frame to the ground and with said mid-section removed a central vertical and increased plant clearance is provided from the mid-portion of said U-shaped main frame to the ground, the metal bar of each of said side sections of said sub-frame including a first and vertical member rigidly connected at its upper end with said main frame and a second and horizontally disposed member extending from the lower end of said first member rearwardly and outwardly for connection with the corresponding guiding handle.

4. In a walking cultivator having supporting wheels and guiding handles, the combination of a bent metal bar comprising an inverted U-shaped main frame having downwardly extending side legs supported by the wheels of the cultivator and for connection with the handles of the cultivator, said legs being outside of said wheels, the mid-portion of said U-shaped frame being higher than and extending over said wheels laterally of the cultivator, a sub-frame including bent metal bars carried by said main frame between said wheels and providing a cultivator bar support between said wheels and in a horizontally disposed plane below the tops of said wheels, said sub-frame comprising two side sections laterally spaced from each other and rigidly secured to said main frame and a removable mid-section for bridging the space between said side sections, and readily removable devices connecting said mid-section with said side sections, whereby with said mid-section connected with said side sections a continuous support for cultivator bars is provided between said wheels and having a vertical plant clearance from the bottom of said sub-frame to the ground and with said mid-section removed a central vertical and increased plant clearance is provided from the mid-portion of said U-shaped main frame to the ground, and a pusher frame including side bars pivotally connected respectively at their forward ends with the guiding handles of the cultivator, a cross bar pivotally connected at its ends with said side bars, and a flexible band secured to and extending between the rear ends of said side bars.

5. In a walking cultivator having supporting wheels and guiding handles, the combination of a bent metal bar comprising an inverted U-shaped main frame having downwardly extending side legs supported by the wheels of the cultivator and for connection with the handles of the cultivator, said legs being outside of said wheels, the mid-portion of said U-shaped frame being higher than and extending over said wheels laterally of the cultivator, a sub-frame including bent metal bars carried by said main frame between said wheels and providing a cultivator bar support between said wheels and in a horizontally disposed plane below the tops of said wheels, said sub-frame comprising two side sections laterally spaced from each other and rigidly secured to said main frame and a removable mid-section for bridging the space between said side sections, and readily removable devices connecting said mid-section with said side sections, whereby with said mid-section connected with said side sections a continuous support for cultivator bars is provided between said wheels and having a vertical plant clearance from the bottom of said sub-frame to the ground and with said mid-section removed a central vertical and increased plant clearance is provided from the mid-portion of said U-shaped main frame to the ground, and a pusher frame including side bars pivotally connected respectively at their forward ends with the guiding handles of the cultivator, a cross bar pivotally connected at its ends with said side bars, and a flexible band secured to and extending between the rear ends of said side bars, the pivotal connections at the forward ends of said side bars comprising universal joints.

6. In a walking cultivator having supporting wheels and guiding handles, the combination of a bent metal bar comprising an inverted U-shaped main frame having downwardly extending side legs supported by the wheels of the cultivator and for connection with the handles of the cultivator, said legs being outside of said wheels, the mid-portion of said U-shaped frame being higher than and extending over said wheels laterally of the cultivator, a sub-frame including bent metal bars carried by said main frame between said wheels and providing a cultivator bar support between said wheels and in a horizontally disposed plane below the tops of said wheels, said sub-frame comprising two side sections laterally spaced from each other and rigidly secured to said main frame and a removable mid-section for bridging the space between said side sections, and readily removable devices connecting said mid-section with said side sections, whereby with said mid-section connected with said side sections a continuous support for cultivator bars is provided between said wheels and having a vertical plant clearance from the bottom of said sub-frame to the ground and with said mid-section removed a central vertical and increased plant clearance is provided from the mid-portion of said U-shaped main frame to the ground, and a pusher frame including side bars pivotally connected respectively at their forward ends with the guiding handles of the cultivator, a cross bar pivotally connected at its ends with said side bars, a flexible band secured to and extending between the rear ends of said side bars, the pivotal connections at the forward ends of said side bars comprising universal joints, and a neck band connected with the rear ends of said side bars to support said flexible band at a desired height.

CHARLES B. ULRICH.